Aug. 23, 1955    L. I. FLANNERY ET AL    2,715,887
AUTOMATIC CHAIN TYPE POULTRY FEEDER
Filed Oct. 9, 1950    3 Sheets-Sheet 1
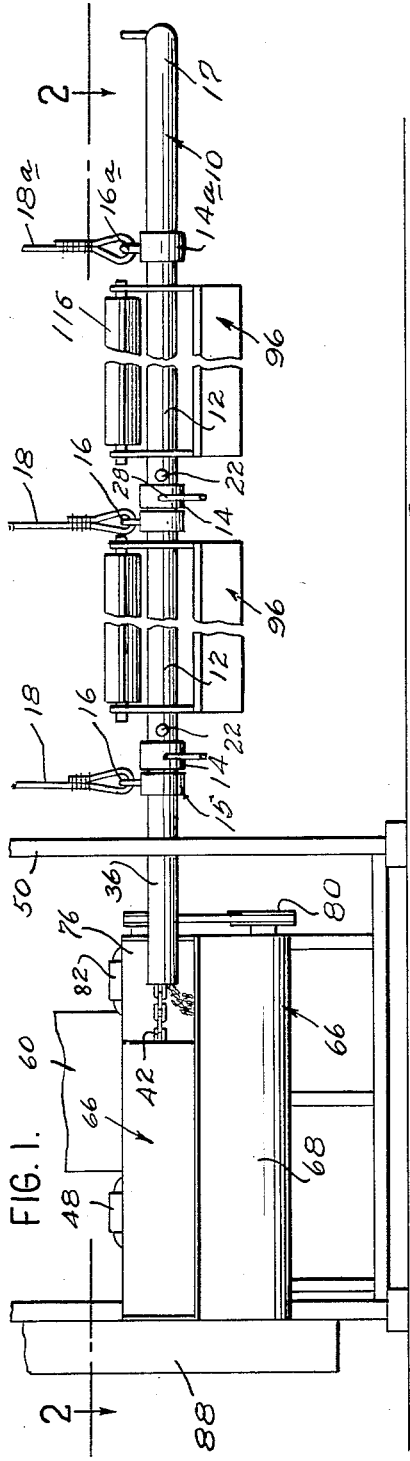
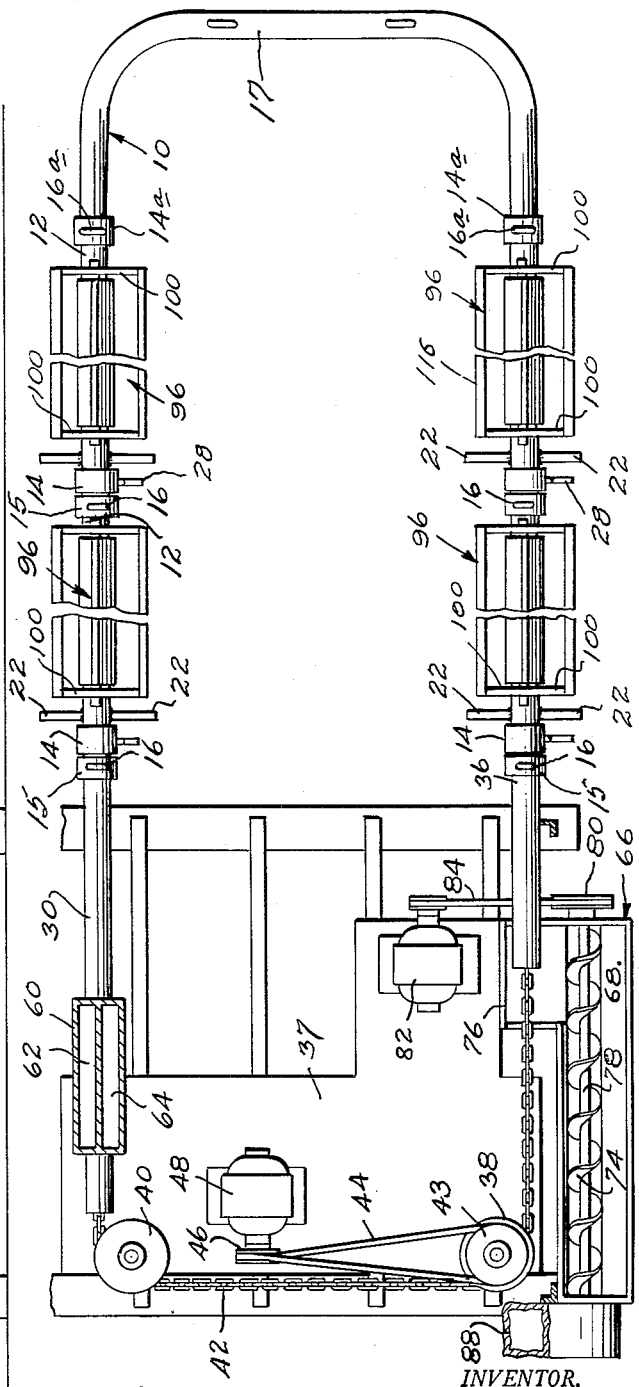
INVENTOR.
ALBERT T. PAULSON and
BY LEE I. FLANNERY
Wilfred E. Lawson Aug. 23, 1955  L. I. FLANNERY ET AL  2,715,887
AUTOMATIC CHAIN TYPE POULTRY FEEDER
Filed Oct. 9, 1950  3 Sheets-Sheet 2
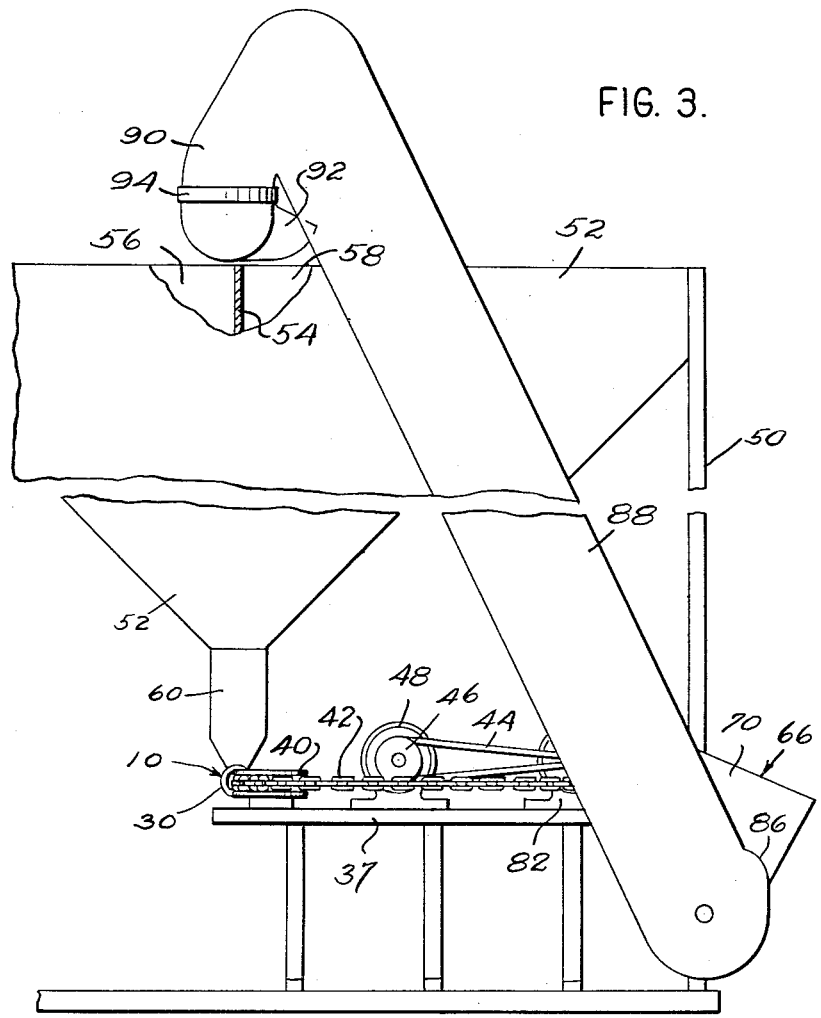
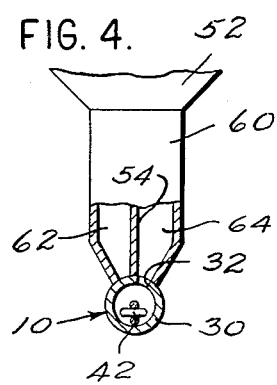
INVENTOR.
ALBERT T. PAULSON and
BY LEE I. FLANNERY

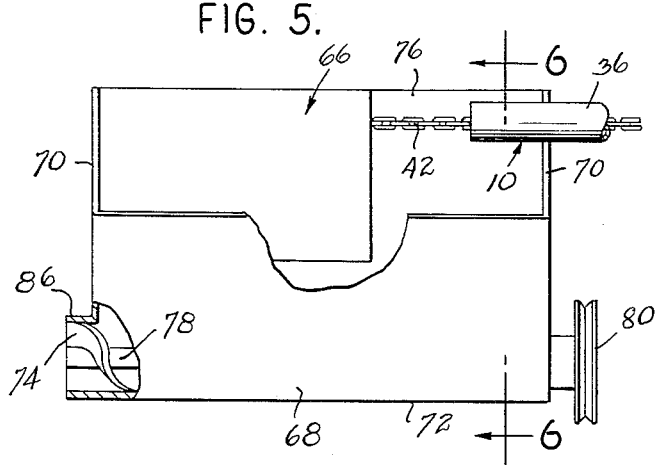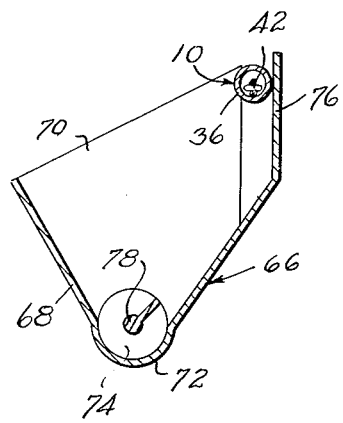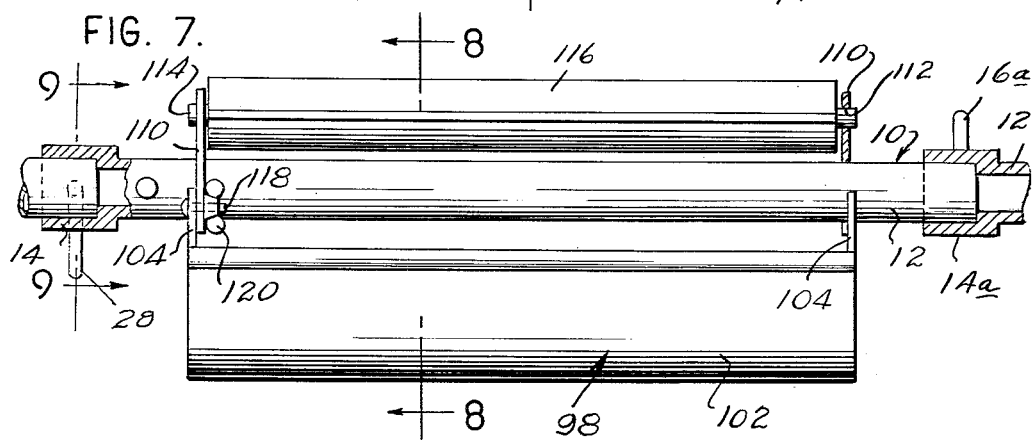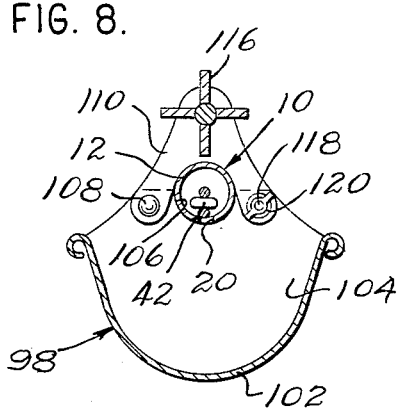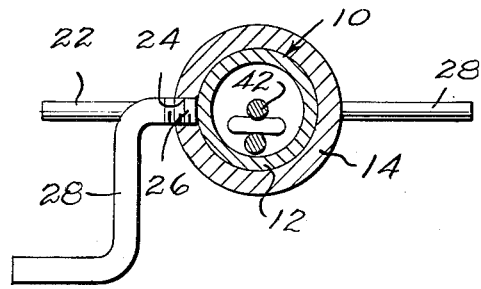

United States Patent Office 2,715,887
Patented Aug. 23, 1955

2,715,887
AUTOMATIC CHAIN TYPE POULTRY FEEDER

Lee I. Flannery and Albert T. Paulson, Centerville, S. Dak.

Application October 9, 1950, Serial No. 189,247

2 Claims. (Cl. 119—52)

This invention relates to poultry feeding apparatus and has for its primary object to enable a large number of birds to be fed in a relatively short time, and with feeds of the desired composition.

In commercial poultry raising where large flocks of birds must be periodically fed, and particularly in the raising of turkeys, the problem of proper distribution of the feed to the feed troughs becomes one of great magnitude. Also owing to the tendency of the birds to perch on objects suspended above the ground level, the problem of keeping the feed in the feed troughs in a clean condition is also presented.

Another object of this invention is to enable feed to be distributed to the feed troughs in a minimum amount of time and with a minimum amount of labor.

A further object is to keep the birds from perching above the feed troughs so as to keep the feed deposited therein in a clean and sanitary condition.

A still further object is to return excess feed to the storage bin so as to effect economies in operation.

The above and other objects may be attained by employing this invention which embodies among its features a substantially horizontal conduit having longitudinally spaced feed discharge openings therein with troughs suspended therefrom to receive feed discharged from the conduit through said openings, means operating in a closed path and extending through the conduit for moving feed longitudinally through the conduit to and past the discharge openings, and means for introducing feed into the conduit for longitudinal movement by the means which operates in the closed path.

Other features include mounting a section of the conduit for rotation about its longitudinal axis, providing in said section an elongated opening through which feed may be introduced into said section and a divided hopper or bin for retaining feeds of two different characters so that by rotating the section, the slot may be made to register with either side of the hopper in order to deliver feeds of different characters through the conduit.

Still other features include suspending from the conduit beneath the discharge openings therein feed troughs, and forming the conduit in separate sections, each independently rotatable so that the discharge openings in a section may be moved into a position to prevent the discharge of the feed moving through said section into its respective feed trough.

Still other features include means at the end of the conduit remote from the feed receiving end thereof for collecting the excess feed carried through said conduit and retaining it to its respective storage bin.

In the drawings:

Figure 1 is a fragmentary side view of poultry feeding apparatus embodying the features of this invention;

Figure 2 is a fragmentary sectional view taken substantially along the line 2—2 of Figure 1;

Figure 3 is an end view of the poultry feeding apparatus illustrated in Figure 1 showing the divided bin and the means for returning excess feed to the bin;

Figure 4 is an enlarged fragmentary sectional view through the feed receiving section of the conduit and the discharge spout of the feed bin;

Figure 5 is an enlarged side view partly in section of the feed receiving hopper;

Figure 6 is a sectional view taken substantially along the line 6—6 of Figure 5;

Figure 7 is an enlarged side view of one of the feed troughs of the demountable type;

Figure 8 is a sectional view taken substantially along the line 8—8 of Figure 7; and Figure 9 is an enlarged sectional view taken substantially along the line 9—9 of Figure 7 with the feed trough omitted.

Referring to the drawings in detail a conduit 10 is comprised of a group of separate tubular sections 12 which may be supported on standards, or provided with collars 15 having suspension eyes 16 for the reception of suspending cables or chains 18 by which the conduits may be suspended from the ceiling of a building in spaced relation to the floor thereof. In the preferred form of the invention, each of the sections 12, which are of course tubular in cross section, has at one of its ends an integral collar or sleeve 14 and its other end is engaged in the collar of an adjacent section for rotation about its longitudinal axis and each section is provided intermediate its ends with a longitudinal row of longitudinally spaced openings 20 (Fig. 8). It will thus be seen that the openings may be turned downwardly as illustrated in Figure 8 to discharge poultry feed carried through the conduit, or they may be turned upwardly to prevent such discharge of feed passing through the conduit. Each separate section 12 is equipped with cross handles 22 by which it may be rotated, and each sleeve or collar 14 is provided with an internally screw threaded opening 24 for the reception of the threaded end 26 of a handled screw 28 so that when a section 12 has been turned to the desired position, it may be locked by causing the threaded end of the screw to impinge thereagainst. Carried by the endmost collar or sleeve 14 adjacent one end of the conduit 10 is a tubular section 30 having formed therein an elongated radial slot 32, and like the sections 12 the section 30 is rotatable in the sleeve 14 of the adjacent section to move the slot into registration with separate passages in the storage bin to be hereinafter more fully described. The tubular section 30 may be rotated about its longitudinal axis in order to change the position of the slot 32 therein by and upon partial turning of the connected sections 12, by means of the handles 22. Carried by the sleeve or collar 14 adjacent the opposite end of the conduit 10 is a tubular section 36 which is solid throughout its entire length and need not be rotatable relative to the collar 14 in which it is supported. This section 36 constitutes the discharge end section of the conduit 10 through which excess feed not discharged through the discharge openings 20 is discharged from the conduit for return to the feed containing bin.

In the preferred form of the invention, the conduit as illustrated in Figure 2, comprising the sections 12, 30 and 36, is substantially U-shaped with the legs and bight portion designated 17, lying horizontal. Each end of the bight portion 17 has a collar 14a thereon in which is rotatably positioned the collariess end of a section 12 which is free to turn therein at all times. This collar 14a may carry a suspension eye 16a for connection with a suspension cable 18a. Supported in any suitable manner adjacent to the ends of the legs of the U-shaped conduit 10 remote from the bight portion 17 thereof is a table 37 upon which are mounted for rotation about spaced vertical axes a drive wheel 38 and an idler 40, the peripheries of which lie in substantially axial alignment with the opposite legs of the U-shaped conduit 10. Trained over the pulleys 38 and 40 and extending through the conduit 10 is an endless chain 42 which when the drive pulley 38 is rotated moves longitudinally through the conduit so that feed entering the opening 32 in the section 30 will be carried through the sections 12 of the conduit 10 and the section 36 thereof.

A suitable drive wheel 43 has driving connection with the drive pulley 38 and is coupled through the medium of a suitable drive belt 44 with the drive pulley 46 of a prime mover 48 such as a conventional electric motor. It will thus be seen that when the motor 48 is energized, the chain 42 will be moved in a closed path through the conduit 10.

Supported on a suitable frame-work 50 above the table 37 is a bin 52 (Fig. 3) which is divided by a partition wall 54 into two separate hoppers 56 and 58. A spout 60 depends from the lower end of the hopper and the partition wall 54 extends vertically through said spout to separate it into two separate passages 62 and 64 which communicate with their respective bins 56 and 58. This structure enables two different types of feed to be supported in the bin 52, and by rotating the section 30 and the sections 12 which are coupled therewith about their longitudinal axes, the slot 32 therein may be moved into registration with either of the passages 62 or 64 in order to enable the user to select the type of feed to be distributed.

In order to return feed carried through the conduit 10 which is not distributed through the discharge openings 20 in the sections 12 thereof a suitable receiver 66 is supported on the frame 50 adjacent to the discharge end of the section 36 of the conduit 10. This receiver comprises a substantially transversely V-shaped hopper 68 which is closed at opposite ends by end walls 70 and carries at its lower end a curved portion 72 in which a conveyor screw 74 is mounted to rotate about a substantially horizontal axis. Extending upwardly from the back side of the V-shaped hopper 68 is a vertical wall 76 against which the section 36 of the conduit 10 is disposed. As illustrated in Figures 1 and 5, the discharge end of the section 36 of the conduit 10 terminates substantially midway between the opposite ends of the wall 76 so that feed being discharged from the end of the section 36 of the conduit 10 will fall into the hopper or receiver 66 to be moved longitudinally therethrough by means of the screw conveyor 74. The screw conveyor 74 is equipped with a longitudinally extending drive shaft 78 which extends through the end wall of the hopper 68 adjacent the discharge section 36 of the conduit 10 and is equipped with a drive pulley 80 which has driving connection with a suitable prime mover 82, such as an electric motor, through the medium of a drive belt 84. The end of the hopper or receiver 66 remote from the pulley 80 on the drive shaft 78 is provided with a discharge spout 86 for discharging the feed advanced through the receiver 66 by the screw conveyor 74 into a suitable elevator 88 which extends upwardly and has its discharge end 90 disposed substantially directly above the partition wall 54 in the bin 52. A discharge spout 92 is swively coupled at 94 to the discharge end of the elevator 88 so that it may be swung in a horizontal arc to bring its discharge end over the hopper 56 or 58 according to the desire of the user.

The device so far described will be found perfectly satisfactory for distributing feed to a large flock or flocks of poultry where the deposit of the feed on the ground or floor is not objectionable. In order, however, to confine the feed and feed the birds from troughs, it will be found to be advantageous to provide feed troughs designated generally 96 which may take the form of those disclosed in Figures 1 and 2 or if preferred of the type disclosed in Figure 7 and designated generally 98. It is to be noted that the suspending end members 100 of the troughs 96 are simply pierced to receive the tubular sections 12 of the conduit 10 whereas the feed trough 98 may be demountably supported on its respective section 12 of the conduit 10. Each feed trough 96 and 98 comprises a trough shaped body 102 having end walls which close opposite ends of the troughs. Each end wall 104 of the trough 102 is provided in its upper end with a recess 106 for the reception of the underside of its respective pipe section 12. Pivotally connected as at 108 to each end wall 104 adjacent its recess 106 is a suspending member 110 which is provided adjacent its upper end with an opening 112 for the reception of a trunnion 114 of a bladed spinner 116 which functions to discourage the birds from roosting above the troughs. The opposite side of the member 110 is detachably coupled to the adjacent end wall 104 by a bolt 118 which is provided with a wing nut 120 to facilitate the rapid mounting or demounting of the trough on its respective section 12 of the conduit 10. It will be understood, of course, that the feed troughs 96 or 98 are suspended on their respective sections 12 of the conduit 10 beneath the discharge openings 20 therein so as to receive the feed discharged through said openings.

In use it will be understood that the bins 56 and 58 of the hopper 52 receive two different types of feed which falling downwardly through said bins enter the passages 62 and 64 respectively. The user by rotating the string of sections 14 and 30 of the conduit 10 may move the slot 32 into registration with the lower end of either passage 62 or 64 so that the feed contained therein will enter the conduit 10 to be moved therethrough by the chain 42. With the motor 48 energized, it will be evident that the chain 42 will move through the conduit 10, thus carrying with it the feed that has been deposited in the section 30 thereof longitudinally through the conduit and as the feed passes the conduit sections 12 having the discharge openings 20 therein disposed downwardly, a portion of the feed carried by the chain will be discharged through the openings 20 into the feed trough supported therebelow. By rotating a conduit section 12 about its longitudinal axis to bring the openings therein out of discharge position, it will be evident that no feed will be deposited in the trough supported thereunder. Any excess feed which is carried beyond the discharge openings in the conduit 10 will be discharged through the end of the section 36 thereof into the receiver 66 and upon energizing the prime mover 82, it will be evident that the feed deposited in the receiver will be advanced by the screw conveyor 74 toward the discharge spout 86, eventually to find its way into the elevator 88 and discharge spout 92 to be returned to a selected bin 56 or 58. In this way no feed is wasted and economies of both time and labor may be effected in feeding a large flock or flocks of poultry.

While in the foregoing there has been shown and described the preferred form of this invention, it is to be understood that minor changes in the details of construction, combination and arrangement of the parts may be resorted to without departing from the spirit and scope of the invention as claimed.

We claim:

1. In a poultry feeder, a horizontally disposed conduit having a plurality of equidistantly spaced, downwardly directed, discharge outlets, said conduit having an upwardly directed slotted inlet opening adjacent one of its ends, a conveyor movable through said conduit to distribute feed entering said inlet opening to said discharge outlets, power means for driving said conveyor, a feed trough positioned beneath said discharge outlets, means at each end of the trough for detachably suspending the trough from said conduit free from ground contact, a feed supply hopper positioned above said inlet opening, and a spout depending from the lower end of said hopper for directing feed into the conduit through said inlet opening.

2. The poultry feeder as defined in claim 1, with the said suspension means comprising flat metal elements of substantially triangular form, each having a recess formed in the center of its base edge for straddling over said conduit, a pivot mounting at a corner of the said base edge, and a securing element engageable with the opposite corner of said base edge.

References Cited in the file of this patent

UNITED STATES PATENTS

| | | |
|---|---|---|
| 871,469 | Bliedung | Nov. 19, 1907 |
| 2,081,947 | McCornack | June 1, 1937 |
| 2,308,701 | Martin | Jan. 19, 1943 |
| 2,545,140 | Escher | Mar. 13, 1951 |
| 2,563,321 | Dugan | Aug. 7, 1951 |
| 2,589,706 | Kitson et al. | Mar. 18, 1952 |
| 2,591,609 | Roberts et al. | Apr. 1, 1952 |
| 2,640,462 | Doty et al. | June 2, 1953 |
| 2,646,023 | Virgil | July 21, 1953 |
| 2,681,639 | Littlefield | June 22, 1954 |

FOREIGN PATENTS

| | | |
|---|---|---|
| 515,102 | Great Britain | Nov. 27, 1939 |

OTHER REFERENCES

Automatic Poultry Feeder Plan, Pennsylvania State College, School of Agriculture, Progress Report No. 2, September 1948.